INVENTORS
HAROLD W. GOLDEN
ARTHUR E. HARTUNG &
FRANK SHANDELMAN

March 15, 1960     H. W. GOLDEN ET AL     2,929,054
LOW LEVEL COMMUTATION SYSTEM
Filed Oct. 10, 1957     2 Sheets-Sheet 2

INVENTORS
HAROLD W. GOLDEN,
ARTHUR E. HARTUNG
& FRANK SHANDELMAN
BY Edward M. Farrell
ATTORNEY ન
United States Patent Office 2,929,054
Patented Mar. 15, 1960

2,929,054
LOW LEVEL COMMUTATION SYSTEM

Harold W. Golden, Penn Valley, and Arthur E. Hartung and Frank Shandelman, Levittown, Pa., assignors to Tele-Dynamics Incorporated, a corporation of Pennsylvania Application October 10, 1957, Serial No. 689,369

7 Claims. (Cl. 340—201)

This invention relates to commutation systems, and more particularly to means for commutating low level voltage signals in a telemetering system.

In guided missiles, temperature is one of the most measured parameters in flight testing. The thermocouple, which is the smallest and the most accurate sensing element used for temperature measurements, is the transducer most often utilized. A thermocouple transducer generates a differential voltage output in the millivolt region. However, in order to transmit this low level information in a telemetering system, the differential voltage generated must be converted to a suitable form, namely a single ended output voltage in the 0 to 5 volt range. With the tremendous growth of guided missiles research, many temperature measurements during a single missile flight are necessary. In order to assure the transmission of a maximum amount of information within a limited frequency band, it is desirable to make use of a commutation system.

The use of D.C. amplifiers for amplifying low level signals in many telemetering systems is often undesirable since such amplifiers are critical and subject to drift. Use of A.C. amplifiers for amplifying the low level signals and converting the amplified A.C. signals into corresponding D.C. signals have been attempted but, in many cases, has been accompanied by many undesirable effects.

It is an object of this invention to provide an improved commutation system which is capable of sampling low level output voltages from a large number of thermocouples, which can be either grounded, partially grounded or ungrounded.

It is a further object of this invention to provide an improved low voltage level commutation system in which noise effects are minimized.

It is still a further object of this invention to provide an improved low voltage level commutation system in which blocking of an amplifier is avoided when one of the thermocouples in the system becomes open or defective.

In accordance with the present invention, a low voltage level commutation system is provided. The system includes a plurality of thermocouples for producing low level signals. The low level signals are amplified by a differential amplifier having a noise balancing means inherent in the null adjustment. The low level signals from the thermocouples are applied to the differential amplifier through a mechanical commutator switch device. The mechanical commutator switch device also includes means for providing a master pulse at the output circuit of the differential amplifier for frame synchronization. The output circuit of the differential amplifier is periodically clamped to ground through the mechanical commutator switch device thereby converting the A.C. wave train pulses to a D.C. wave train. The output voltage from the differential amplifier may be applied to a load comprising a voltage controlled oscillator. A blanking level circuit is also associated with the output circuit of the differential amplifier to maintain the voltage applied to the voltage controlled oscillator with a predetermined minimum level.

Other objects and advantages of the present invention will be apparent and suggest themselves to those skilled in the art to which the present invention is related, from a reading of the following specification and claims in conjunction with the accompanying drawing, in which like elements are referred to with like reference numbers:

Figures 1, 2A, 2B, 2C:
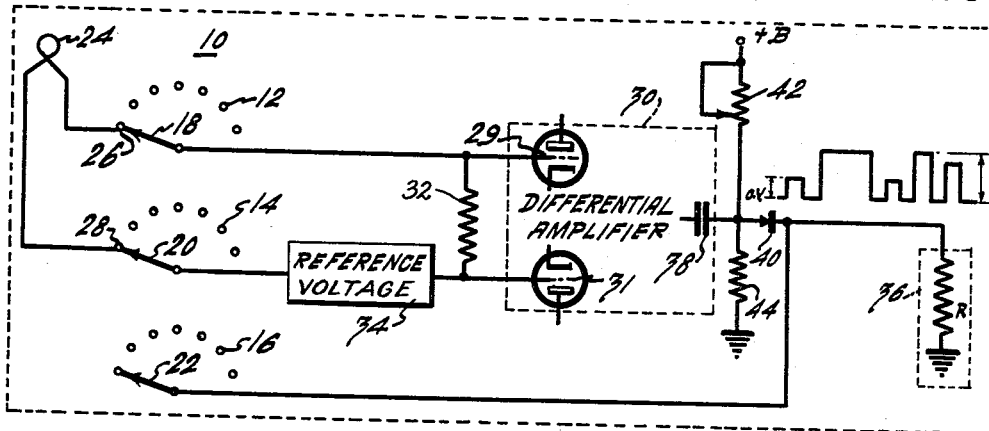
Figure 1 is a system functional block diagram of a low level commutation system, in accordance with the present invention.
Figure 2a illustrates a pair of information rings included in a commutator arrangement included in the present invention.
Figure 2b is a waveform illustrating information signals from the information rings which may be applied to a differential amplifier illustrated in Figure 1.
Figure 2c illustrates a third ring included in the commutator, for providing clamping and a master pulse for the differential amplifier illustrated in Figure 1.

Referring particularly to Figure 1, a commutator switch device 10 comprises three rings 12, 14 and 16 with each of the rings including a plurality of electrical contacts together with brush members 18, 20 and 22 adapted to sequentially engage the contacts. A thermocouple 24 is connected to a pair of contacts 26 and 28 on the rings 12 and 14, respectively. As the brush members 18 and 20 engage the contacts 26 and 28, a sample of the output voltage from the thermocouple 24 is applied to a differential amplifier 30.

The differential amplifier 30 includes an input circuit having a resistor 32 connected thereacross. The differential amplifier may include a pair of triode vacuum tubes including control grids 29 and 31. A source of reference voltage 34 is connected to the thermocouple 24 through the brush member 20 and the contact 28. The output voltage from the differential amplifier 30 is applied to a load 36 through a capacitor 38 and a diode 40. Blanking level means for the output voltage from the differential amplifier is provided by a source designated as B+ through a variable resistor 42 and a resistor 44. The output circuit of the differential amplifier 30 is also connected to various contacts on the ring 16 through the brush member 22.

The rings 12 and 14 may be considered as information rings adapted to receive information voltages from the thermocouple 24 and other thermocouples in the system. Such voltages from thermocouples are generally extremely low being in the milli-volt region.

An important feature of the present invention relates to the resistor 32 connected across the input circuit of the differential amplifier 30. This resistor eliminates the problem of the amplifier blocking when an associated thermocouple opens. If the amplifier is caused to block due to the opening of a signal of a single thermocouple, information signals from all of the other thermocouples in the system will be lost. Blocking of the amplifier is prevented by the common mode rejection feature of the differential amplifier, since the same noise signal is applied to control grids 29 and 31. The source of this noise signal may be from the various elements or components associated with the system. For example, this noise signal may include the noise resulting from slight thermal agitation within the resistors, electrical conductors, the mechanical commutators or various other elements used in the system. A primary source of noise in the form of noise spikes is created if one of the thermocouples opens and the brush members associated with the commutator go from a contact of low impedance (i.e., ground) to a contact of extremely high impedance. Under these conditions, spray noise is picked up from numerous sources. The resistor 32 is of a relatively low value in the range of 10,000 ohms. Thus, for example, if a noise signal is applied to either of the control grids 29 or 31, only a small percentage of such noise will be dropped across the resistor 32. Consequently, substantially the same noise signals are applied to both the control grids 29 and 31. The full noise signal is applied to one of the control grids and approximately 90% of the same signal is applied to the other grid.

The resistor 32 may be considered as a noise balancing means, since it provides a path to permit noise signals to be applied to both control grids 29 and 31 simultaneously. For example, if this resistor 32 were not present, noise signals applied to control grid 29 would not be applied directly to the control grid 31, and vice versa. Under these conditions, the voltage at one of the control grids 29 or 31 would tend to build up and eventually cause the amplifier 30 to block thereby resulting in loss of information signals.

It is known that most thermocouples will produce a voltage under normal ambient conditions. A source of reference voltage 34 is therefore placed in series with the ring 14 and to one input of the differential amplifier 30. This source of voltage provides a reference voltage equal and opposite to the minimum output signal of a thermocouples use. This source of voltage may be variable and its value will generally be dependent upon the types of thermocouples used.

The differential amplifier 30 amplifies and converts the sampled thermocouples signals to a single ended pulse train having a 20 percent blanking level. The blanking level is determined by the setting of the resistor 42. The output voltage from the differential amplifier 30 may then be used to frequency modulate a voltage controlled oscillator which may be included in the load 36. The output signal from such a subcarrier voltage controlled oscillator in conventional types of telemetering systems may then combine with additional subcarrier signals for transmission by an R.F. link.

It is seen that the differential amplifiers 29 and 31 may be considered double ended since the input terminals are connected to the two control grids thereof. A single ended pulse train is developed across the resistor 44 since it is connected across to differential amplifier 30.

The resistor 42 may be adjusted to various levels, dependent upon the point to which it is desired to have the diode 40 conduct. In many telemetering systems, it is desirable to have this blanking point at approximately 20% of the maximum signal voltage from the differential amplifier 30. This blanking level represents zero information as distinguished from zero level. Zero level would represent malformation within the system whereas zero information represents a zero output information signal from a properly operating system. This is one of the standard requirements set up by the I.R.I.G. (Inter Range Instrumentation Group) for telemetering systems.

The commutator 10 may be of various types, such as the one shown and described in a patent issued to C. W. Baechler, Jr. et al. 2,634,342. This patent was issued on April 7, 1953, and assigned to the same assignee as the present invention.

The ring 16 serves a dual purpose providing a master or synchronizing pulse at the output circuit of the differential amplifier and to provide means for periodically clamping the output circuit of the differential amplifier to ground.

The diode 40 prevents the master pulse signal from the brush 22 from being fed back through the differential amplifier.

The differential amplifier circuit is not shown in detail, since such amplifiers are well known to those skilled in the art. Various types of such amplifiers may be used and are found in currently available literature.

Referring particularly to Figures 2a and 2c, the functions of the commutator rings 12, 14 and 16 illustrated in Figure 1 are illustrated in greater detail. A plurality of thermocouples 46 are connected across rings 12 and 14. The alternate contact between the thermocouple connections are jumped together and returned to ground. Returning alternate contacts to ground constitutes another feature of the present invention.

Ordinarily, if alternate contacts are not returned to ground, switching from a low impedance of a thermocouple to a high impedance of a differential amplifier causes large noise spikes to be produced. The common mode rejection feature of the differential amplifier permits satisfactory operation, provided the noise spikes occur simultaneously. However, this will be the case if the brush width, contact or pin diameter and spacing associated with each of the information rings are exactly the same. A variation in one of these dimensions produces a large noise spike in one input of the differential amplifier and not on the other. Such a condition tends to cause blocking of the amplifier.

In the present invention, the alternate contacts of the information rings 12 and 14 are returned to ground to avoid blocking of the differential amplifier which may result from noise spikes. With alternate contacts grounded, the switching action by the commutator is from the low impedance of a thermocouple to ground. Under these conditions, the noise spikes produced are extremely small. Consequently, proper phase adjustments become much less critical.

Figure 2b illustrates sampled variable amplitude modulated information signals from the thermocouples 46.

Figure 2D:
Figures 2d and 2e are waveforms illustrating the types of signals which may be applied to the amplifier illustrated in Figure 1 from the ring of the commutator illustrated in Figure 2c; and, Figure 3 is a block diagram illustrating in greater detail the low level differential amplifier and other associated amplifiers utilized in the present invention.
Figure 2E:

A battery or other source of voltage 48 is connected to contacts 50 on the ring 16. When the brush member 22 (Fig. 1) engages the contacts 50 a voltage is applied to the output circuit of the differential amplifier 30. This output voltage is much wider than the information signal and is used as a master or synchronizing pulse. This master pulse is necessary at the ground receiving station for synchronization during decommutation of the information signals. The wide pulse is obtained since the brush associated with the ring 16 makes the next contact before breaking the previous contact. The master pulse generated is illustrated by the curve in Figure 2e. The terms wide or wider refer to the time interval or durations of the pulse. A master or synchronizing pulse, in the embodiment described, is of a longer time duration than the information pulse.

During the cycle between information signals, brush member 22 (Fig. 1) is periodically returned to ground through contacts 52 and other grounded contacts of the ring 16. Clamping the output circuit of the differential amplifier 30 periodically to ground during the "off" time constitutes another feature of the present invention and makes it impossible for the output signal from the amplifier to represent a direct current voltage information signal. Such direct (D.C.) current signals are generally from 0 to 5 volts in many telemetering systems. Such D.C. signals are necessary for modulating most sub-carrier oscillators. The waveform shown in Figure 2b illustrates the clamping ring output to the differential amplifier.

Figure 3:
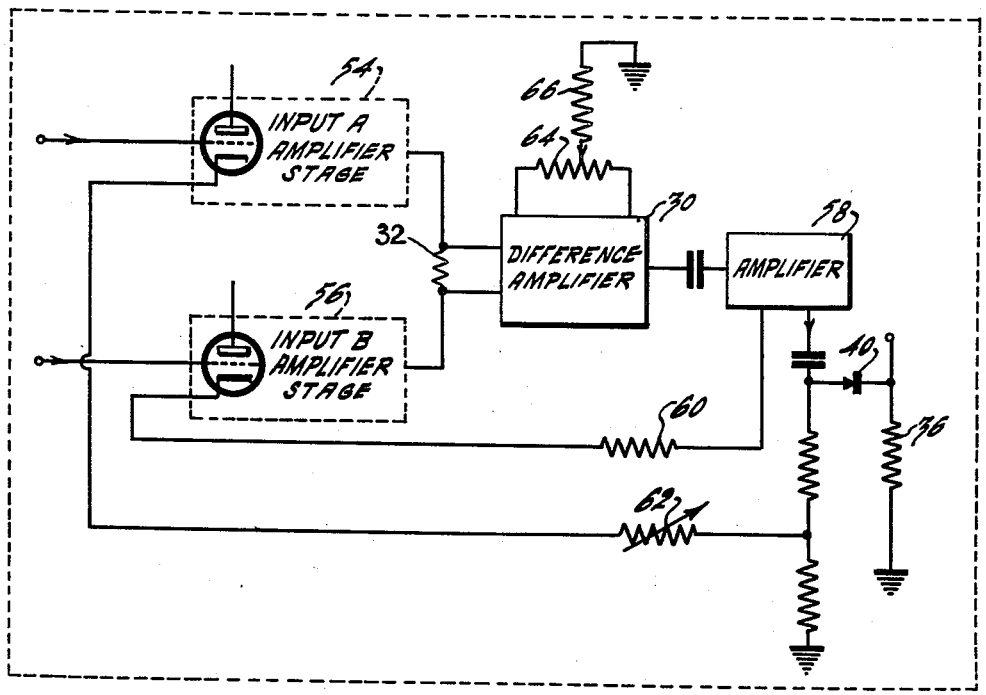

Referring particularly to Figure 3, a block diagram illustrating the complete amplifying system is shown. Since the output voltage from the thermocouple is generally very low, it is sometimes necessary to amplify the signal prior to applying them to the differential amplifier. These signals are amplified by amplifiers 54 and 56 and applied to the differential amplifier 30. The output voltage from the differential amplifier is then further amplified by an amplifier 58 and applied to the load. The input amplifiers 54 and 56 may be of the conventional type using very low noise triodes. The output voltages from the amplifiers 54 and 56 are fed through the differential amplifier which includes a null control network comprising a variable resistor 64 and a fixed resistor 66 connected to ground. The null control network compensates for variations in stage gain and allows zero output voltage for equal input voltages. The two tubes used in the amplifiers 54 and 56 are closely matched for plate current and amplification factor to insure proper biasing of the differential amplifier. Since it is mandatory to have the input grids of the amplifiers 54 and 56 free of feedback circuitry, negative feedback is accomplished at the input cathodes. Oppositely phase feedback voltages are obtained from the final stage and are fed through the input cathodes through dropping resistors 60 and 62. The resistor 62 is made variable and may be used as a gain control. The use of heavy feedback in the system shown aids in proper operation and minimizes errors due to tube and component aging.

In the commutator switch device, it is desirable that chattering and other contact noise effects be minimized. Consequently, the brush members are designed so that they make the next contact before breaking the previous contact during operation.

What is claimed is:

1. A low level commutation system comprising a plurality of thermocouples for measuring low level signals, a differential amplifier including input and output circuits for amplifying said low level signals, noise balancing means connected across the input circuit of said differential amplifier, a commutator, means for applying said signals from said plurality of thermocouples to said input circuit of said differential amplifier through said commutator, means for periodically connecting said input and output circuits of said differential amplifier to a point of reference potential through said commutator, a utilization circuit, and means for connecting the output circuit of said differential amplifier to said utilization circuit.

2. In a low voltage level commutation system, a circuit for providing a direct current potential restoration and insertion of a synchronization signal in a commutated wave train, a plurality of thermocouples for measuring low level signals, a commutator adapted to be connected to said plurality of thermocouples for sampling the output signals therefrom, a differential amplifier for amplifying said sampled information signals, said differential amplifier including an input and an output circuit, noise balancing means including a resistor connected across said input circuit, means for applying said information signals to said differential amplifier through said commutator, means for periodically connecting said input and output circuits to said source of reference potential through said commutator whereby said output circuit is periodically restored to a predetermined direct current potential, means for inserting synchronization signals with said information signals amplified by said differential amplifier in the output circuit of said differential amplifier, and means for applying said amplified information signals and said synchronization signals to a utilization circuit.

3. A low level commutation system comprising a plurality of thermocouples for measuring low level signals, a differential amplifier including input and output circuits for amplifying said low level signals, balancing means including a resistor of relatively low value connected across the input circuit of said differential amplifier, a mechanical commutator having at least three rings with each of said rings including a plurality of electrical contacts, means for applying said signals from said plurality of thermocouples to said input circuit of said differential amplifier through the electrical contacts of two of said rings in said mechanical commutator, means for grounding the alternate contacts of said two rings for periodically returning said input circuit to a point of reference potential, means associated with the electrical contacts in said third ring of said commutator for providing a master pulse and points of reference potentials, means for connecting said third ring of said commutator to said output circuit of said differential amplifier, means further associated with said third ring of said commutator for periodically returning said output circuit to a point of reference potential, and means for connecting the output circuit of said differential amplifier to a utilization circuit.

4. A low level commutation system comprising a plurality of thermocouples for measuring low level signals, a differential amplifier including input and output circuits for amplifying said low level signals, noise balancing means including a resistor of relatively low value connected across the input circuit of said differential amplifier, a mechanical commutator having at least three rings with each of said rings including a plurality of electrical contacts, means for applying said signals from said plurality of thermocouples to said input circuit of said differential amplifier through the electrical contacts of two of said rings in said mechanical commutator, means for periodically returning said input circuit to a point of reference potential through the contacts of said two rings, means associated with the electrical contacts in said third ring of said commutator for providing a master pulse and points of reference potentials, means for connecting said third ring of said commutator to said output circuit of said differential amplifier to periodically return said output circuit to said points of reference potentials, a load circuit, means for connecting the output circuit of said differential amplifier to said load circuit, and a blanking level circuit associated with the output circuit of said differential amplifier to maintain the voltage applied to said voltage controlled oscillator at a predetermined minimum level.

5. A circuit for providing direct current voltage restoration and insertion of a synchronization signal in a commutated wave train comprising a commutator adapted to be connected to a source of information signals and to a source of direct current reference potential, a differential amplifier for amplifying said information signals, said differential amplifier including an input and an output circuit, means for applying said information signals to said differential amplifier through said commutator, noise balancing means including a resistor of relatively low value connected across said input circuit of said differential amplifier, means for periodically connecting said output circuit to said source of reference potential through said commutator whereby said output circuit is periodically restored to a predetermined direct current potential, means for inserting synchronization signals with said information signals amplified by said differential amplifier, and means for applying said amplified information signals and said synchronization signals to a utilization circuit.

6. A low level commutation system comprising a plurality of thermocouples for measuring low level signals, a diffential amplifier including input and output circuits for amplifying said low level signals, noise balancing means including a resistor of relatively low value connected across the input circuit of said differential amplifier, a mechanical commutator having at least three rings with each of said rings including a plurality of electrical contacts, means for connecting said plurality of thermocouples to the electrical contacts of two of said rings in said mechanical commutator, an amplifier connected between each of said two rings for amplifying the output signals from said plurality of thermocouples, means for periodically returning the input circuit of said differential amplifier to ground through said two rings, means for applying the output signals from said amplifiers to said differential amplifier, means associated with the electrical contacts in said third ring of said commutator for providing a master pulse and a ground return, means for connecting said third ring of said commutator to said output circuit of said differential amplifier whereby said output circuit receives said master pulse and is periodically returned to ground, a load circuit, means for connecting the output circuit of said differential amplifier to said load circuit, and a blanking level circuit associated with the output circuit of said differential amplifier to maintain the voltage applied to said load circuit at a predetermined minimum level.

7. A low level commutation system as set forth in claim 6 wherein alternate contacts of said two of said rings are returned to ground.

References Cited in the file of this patent
UNITED STATES PATENTS

| | | |
|---|---|---|
| 2,798,986 | Livingston | July 9, 1957 |
| 2,833,862 | Tolson | May 6, 1958 |

OTHER REFERENCES

Book by Seely: Electron-Tube Circuits, McGraw-Hill Book Co., 1950, page 116 relied on.